(12) United States Patent
Teshima

(10) Patent No.: US 10,507,873 B2
(45) Date of Patent: Dec. 17, 2019

(54) RESIN STRUCTURE AND VEHICLE COMPONENT

(71) Applicant: Teijin Limited, Osaka-Shi, Osaka (JP)

(72) Inventor: Masatomo Teshima, Osaka (JP)

(73) Assignee: Teijin Limited, Osaka-Shi, Osaka (JP)

(*) Notice: Subject to any disclaimer, the term of this patent is extended or adjusted under 35 U.S.C. 154(b) by 161 days.

(21) Appl. No.: 15/560,586

(22) PCT Filed: Feb. 25, 2016

(86) PCT No.: PCT/JP2016/055703
§ 371 (c)(1),
(2) Date: Sep. 22, 2017

(87) PCT Pub. No.: WO2016/152374
PCT Pub. Date: Sep. 29, 2016

(65) Prior Publication Data
US 2018/0050736 A1  Feb. 22, 2018

(30) Foreign Application Priority Data
Mar. 24, 2015  (JP) .................................. 2015-060973

(51) Int. Cl.
*B62D 29/04* (2006.01)
*B60R 19/04* (2006.01)
(Continued)

(52) U.S. Cl.
CPC ............ *B62D 29/043* (2013.01); *B60R 19/02* (2013.01); *B60R 19/03* (2013.01); *B60R 19/04* (2013.01);
(Continued)

(58) Field of Classification Search
CPC ........ B62D 29/043; B60R 19/03; B60R 19/04
See application file for complete search history.

(56) References Cited

U.S. PATENT DOCUMENTS

| 5,219,913 A | 6/1993 | Tomomatsu et al. |
| 2004/0036302 A1* | 2/2004 | Shuler .................... B60R 19/18 293/120 |

(Continued)

FOREIGN PATENT DOCUMENTS

| JP | H02-175451 A | 7/1990 |
| JP | H04-120145 A | 4/1992 |

(Continued)

OTHER PUBLICATIONS

Feb. 27, 2018—(EP) Search Report—App 16768277.2.
(Continued)

*Primary Examiner* — Jason S Morrow
(74) *Attorney, Agent, or Firm* — Banner & Witcoff, Ltd.

(57) ABSTRACT

A resin structure having an impact absorbing property includes a resin member including a resin material and having an uneven thickness structure. The resin member includes a thick-walled portion having an average thickness of a first value in an impact absorbing direction and two thin-walled portions having an average thickness of less than the first value in the impact absorbing direction. The thick-walled portion is disposed between the two thin-walled portions. The Expressions (I) and (II) are satisfied.

$$1 < t1/t2 < 1.545 \times (L/d)^{-0.107} \quad (I)$$

$$L/d > 0 \quad (II)$$

In Expressions (I) and (II), t1 represents an average thickness (mm) of the thick-walled portion. t2 represents an average thickness (mm) of the thin-walled portions. L represents an inter-connection-point distance (mm) between connection points formed on the two thin-walled portions, respectively, and connected to other structures. d represents
(Continued)

a maximum height (mm) in the impact absorbing direction in a range between the connection points of the resin member.

5 Claims, 9 Drawing Sheets

(51) Int. Cl.
B60R 19/02 (2006.01)
B62D 25/02 (2006.01)
B60R 19/03 (2006.01)
B60R 19/18 (2006.01)

(52) U.S. Cl.
CPC ............ B60R 19/18 (2013.01); B62D 25/025 (2013.01); B62D 29/04 (2013.01); *B60R 2019/1833* (2013.01)

(56) References Cited

U.S. PATENT DOCUMENTS

| | | | |
|---|---|---|---|
| 2012/0146347 A1 | 6/2012 | Huang et al. | |
| 2014/0246881 A1* | 9/2014 | Hasegawa | B62D 29/043 296/191 |
| 2014/0367982 A1* | 12/2014 | Kano | B60R 19/18 293/121 |
| 2016/0001721 A1* | 1/2016 | Owens | B60R 19/023 296/187.03 |
| 2016/0200014 A1* | 7/2016 | Patberg | B29C 70/46 |
| 2017/0036624 A1* | 2/2017 | Yabu | B60R 19/03 |

FOREIGN PATENT DOCUMENTS

| | | |
|---|---|---|
| JP | H06-063446 A | 9/1994 |
| JP | 2007-313973 A | 12/2007 |
| JP | 2010-137639 A | 6/2010 |
| WO | 2012/056350 A1 | 5/2012 |

OTHER PUBLICATIONS

Mar. 9, 2018—(EP) Office Action—App 16768277.2.
May 24, 2016—International Search Report—Intl App PCT/JP2016/055703.
May 24, 2016—(PCT/JP)—Written Opinion of the International Searching Authority—App 2016-055703—Eng Tran.

* cited by examiner

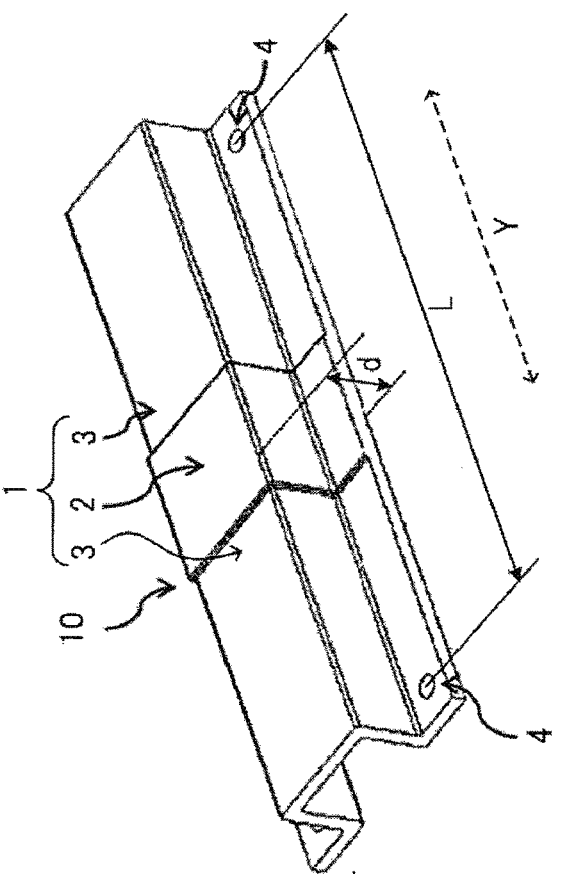
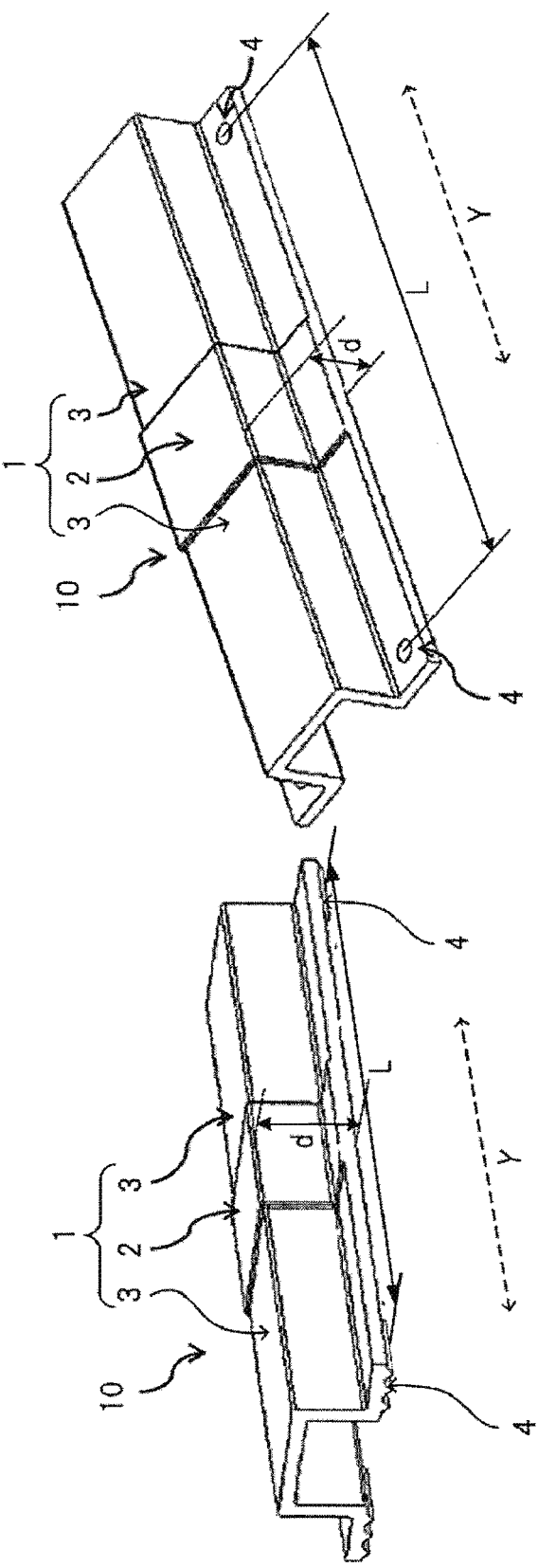

ing an average thickness of a second value in the impact

RESIN STRUCTURE AND VEHICLE COMPONENT

CROSS REFERENCE TO RELATED APPLICATIONS

This is a U.S. National Phase Application under 35 U.S.C. § 371 of International Application No. PCT/JP2016/055703, filed Feb. 25, 2016, which claims priority to Japanese Application No. 2015-060973, filed Mar. 24, 2015, the entire contents of each of which are incorporated herein by reference.

TECHNICAL FIELD

The present invention relates to a structure including a resin member, and more specifically relates to a bent structure which exhibits an excellent impact absorbing property by including a resin member having a specific uneven thickness structure.

BACKGROUND ART

A structure such as a bumper beam, a side sill, or a B pillar is provided on front, rear, left, and right sides of a vehicle body. In the related art, in general, such a structure is formed of a metal material. However, recently, a reduction in the weight of a vehicle body has been desired, for example, in order to improve the fuel efficiency. Therefore, a research on replacement of the metal material with a resin material has been actively carried out.

In order not only to reduce the weight but also to protect passengers during collision, it is required that the structure has an excellent impact absorbing property. In addition, during collision, it is required that fracturing does not occur at a position other than a fracture origin where fracturing is estimated to occur during the design phase. In order to satisfy the requirements, for example, a method of disposing ribs on the entire front surface of a structure is studied in Patent Document 1.

On the other hand, a configuration of providing a fragile portion at a load input position in order to control the fracture origin during collision is studied in Patent Document 2

CITATION LIST

Patent Documents

Patent Document 1: JP-UM-A-6-63446
Patent Document 2: JP-A-2007-313973

SUMMARY OF INVENTION

Problems to be Solved by the Invention

However, in the structure described in Patent Document 1, a portion to which a low load is input is also reinforced. Therefore, there is a problem in that a reduction in weight, which is an important advantageous effect of a resin material, cannot be sufficiently achieved. In addition, since the structure becomes complicated, there is also a problem in that the manufacturing steps cannot be simplified.

In addition, in the structure described in Patent Document 2, the load input position is the fragile portion. Therefore, the impact absorption capacity of the load input position decreases, and there is a problem in that it is difficult to achieve a desired impact absorbing property.

Accordingly, in the related art, it is difficult for a resin structure, which is used as a vehicle member or the like, to simultaneously realize a sufficient reduction in weight and an excellent impact absorbing property.

Under the above-described circumstances, a configuration of adopting an uneven thickness structure in a resin structure can also be considered as one of the effective methods for improving an impact absorbing property while suppressing an increase in weight to realize a sufficient reduction in weight. The "uneven thickness structure" herein refers to a structure which includes a plurality of regions having different thicknesses in an impact absorbing direction of the resin structure (which has the same definition as a direction in which a load is applied to the resin structure). A region having a relatively large thickness will be referred to as a "thick-walled portion", and a region having a relatively small thickness will be referred to as a "thin-walled portion". It is difficult to form this uneven thickness structure using a metal material. However, by using a resin material, it has become easy to freely form the uneven thickness structure.

In a case where a resin structure having an uneven thickness structure is formed using a resin material, the simplification of the manufacturing steps and a reduction in size can be realized by setting only the thickness of a region around a position to which an external load is applied (hereinafter referred to as "load point") to be larger than those of other regions. However, in a case where only the configuration of increasing the thickness of the region around the load point is adopted, when an external load is applied to the load point, fracturing occurs near a boundary between the thick-walled portion and the thin-walled portion, and there is a problem in that fracturing occurs at a position different from the thick-walled portion (load point) which is initially designed as the fracture origin. In addition, the fracture origin is changed to a position other than the load point, and thus there is also a problem in that the impact absorbing property becomes lower than an initially designed value.

The present invention has been made in consideration of the above-described problems, and an object thereof is to provide a light-weight resin structure having an excellent bending impact absorbing property which can be manufactured using a simple manufacturing method.

Means For Solving the Problems

In order to achieve the above-described object, the present inventors performed a thorough investigation and found that, by adopting an uneven thickness structure in which the thickness of a thick-walled portion and the thickness of a thin-walled portion satisfy predetermined conditions, when an external energy is applied to a load point, the energy absorption capacity per unit weight can be increased, and a change of a fracture origin can be prevented, thereby completing the present invention.

In order to achieve the above-described object, the following inventions are provided as present inventions.

(1) A resin structure having an impact absorbing property, including:
  a resin member including a resin material and having an uneven thickness structure,
  in which the resin member includes a thick-walled portion having an average thickness of a first value in an impact absorbing direction and two thin-walled portions having an average thickness of less than the first value in the impact absorbing direction,
the thick-walled portion is disposed between the two thin-walled portions, and
the following Expressions (I) and (II) are satisfied.

$$1 < t1/t2 < 1.545 \times (L/d)^{-0.107} \quad \text{(I)}$$

$$L/d > 0 \quad \text{(II)}$$

In the above Expressions (I) and (II), t1 represents an average thickness (mm) of the thick-walled portion, t2 represents an average thickness (mm) of the thin-walled portions, L represents an inter-connection-point distance (mm) between connection points which are formed on the two thin-walled portions, respectively, and are connected to other structures, and d represents a maximum height (mm) in the impact absorbing direction in a range between the connection points of the resin member.
(2) The resin structure according to item (1) above,
in which the resin structure is formed of a single resin member.
(3) The resin structure according to item (1) or (2) above,
in which the resin material is a fiber-reinforced resin material including reinforcing fibers and a matrix resin.
(4) The resin structure according to item (3) above,
wherein the fiber-reinforced resin material has a tensile modulus of 10 GPa or higher and a tensile strength of 100 MPa or higher.
(5) A vehicle component including:
a resin structure according to any one of items (1) to (4) above.

Advantageous Effects of Invention

A resin structure according to the present invention can be manufactured using a simple manufacturing method and has an advantageous effect in that it is light-weight and has an excellent bending impact absorbing property.

BRIEF DESCRIPTION OF DRAWINGS

FIGS. 4A and 4B are diagrams for describing parameters used in Expressions (I) and (II).

EMBODIMENTS FOR CARRYING OUT THE INVENTION

Figure 1:
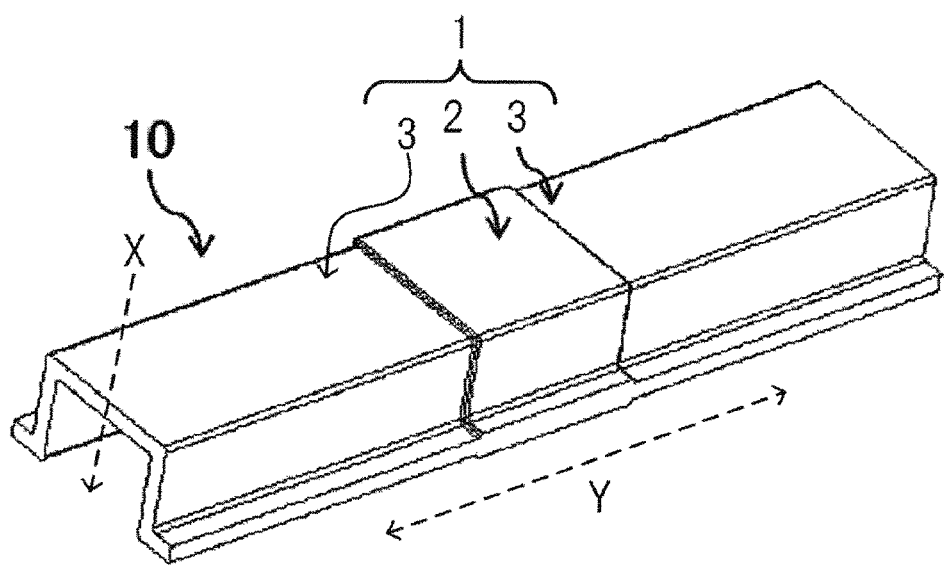
FIG. 1 is a schematic diagram showing an example of a resin structure according to the present invention.

Hereinafter, a resin structure and a vehicle component according to the present invention will be described.

First. Resin Structure

First, the resin structure according to the present invention will be described. As described above, a resin structure according to the present invention having an impact absorbing property includes a resin member containing a resin material and having an uneven thickness structure, in which the resin member includes a thick-walled portion having an average thickness of a first value in an impact absorbing direction and two thin-walled portions having an average thickness of less than the first value in the impact absorbing direction, the thick-walled portion is disposed between the two thin-walled portions, and the following Expressions (I) and (II) are satisfied.

$$1 < t1/t2 < 1.545 \times (L/d)^{-0.107} \quad \text{(I)}$$

$$L/d > 0 \quad \text{(II)}$$

In Expressions (I) and (II), t1 represents the average thickness (mm) of the thick-walled portion, t2 represents the average thickness (mm) of the thin-walled portions, L represents an inter-connection-point distance (mm) between connection points which are formed on the two thin-walled portions, respectively, and are connected to other structures, and d represents a maximum height (mm) in the impact absorbing direction in a range between the connection points of the resin member.

Here, the "uneven thickness structure" according to the present invention refers to a structure which includes a plurality of regions having different thicknesses in the impact absorbing direction. A region having a thickness of the first value will be referred to as a "thick-walled portion", and a region having a thickness of less than the first value will be referred to as "thin-walled portion". The thickness of a region refers to an average value of all the measured values obtained by measuring the thickness of this region at a plurality of positions (for example, 10 positions) at regular intervals in an arbitrary direction. In addition, the "uneven thickness structure" according to the present invention refers to a structure in which a boundary between the "thick-walled portion" and the "thin-walled portion" is distinguishable. For example, a structure having a shape whose thickness continuously changes at a given tilt angle in which a boundary between the "thick-walled portion" and the "uneven thickness portion" is not distinguishable does not correspond to the "uneven thickness structure" according to the present invention. In addition, as described below, the inter-connection-point distance L refers to the minimum distance between the connection points which passes through the load point (thick-walled portion). Therefore, in the present invention, typically, the "thick-walled portion" is not a connection point. Accordingly, in the "uneven thickness structure" according to the present invention, typically, positions corresponding to the "thin-walled portions" are the connection points, and thus the "thin-walled portions" are formed such that the "thick-walled portion" is interposed therebetween.

As can be clearly seen from the fact that the Expressions (I) and (II) includes the inter-connection-point distance L, the resin structure according to the present invention is connected to other structures. In addition, the resin structure according to the present invention is connected to other structures at at least two or more connection points. In a case where the resin structure according to the present invention is connected to other structures, the above-described connection points are points where the resin structure according to the present invention is actually connected to the other structures. On the other hand, in the resin structure which is not connected to other structures, it is assumed that it is difficult to recognize the connection points. In this case, positions of connection portions, which are formed in the resin structure according to the present invention in order to connect the resin structure to other structures, are the connection points. Here, examples of the form of the connection portion include a through hole, a connection component, and an uneven portion (energy director). Of course, the form of the connection portion can be arbitrarily determined depending on the shapes of other structures and the like and thus is not limited to the above-described examples. Further, depending on the intended use and the like of the resin structure according to the present invention, the connection point in the resin member according to the present invention may not be formed as a connection portion in a particular shape or the like. In this case, positions which are expected to be connected to other structures are the connection points depending on the intended use and structure of the resin structure according to the present invention, or the form of the connection to other structures.

In the present invention, the inter-connection-point distance L refers to the minimum distance between the connection points which passes through the load point (thick-walled portion). The inter-connection-point distance refers to the length of a straight line connecting the centers of regions (for example, regions where a through hole is formed, regions where a connection component is formed, or regions where an energy director is formed) of the resin structure, which are connected to other structures, in a direction in which the thick-walled portion and the thin-walled portions are disposed. In addition, this "between the centers" will be referred to as "between the connection points".

The resin structure according to the present invention absorbs an impact energy which is input from one direction of the resin structure so as to suppress an impact to the opposite direction. In addition, the resin structure according to the present invention is assumed to absorb an impact to a direction perpendicular to a surface restricted by the connection point. Hereinafter, in the present invention, this "direction perpendicular to a surface restricted by the connection point" will be referred to as "impact absorbing direction". In addition, the "impact absorbing property" refers to a value obtained by dividing the absorbed impact energy capacity by the weight. As this value increases, the "impact absorbing property" is further improved.

The resin structure according to the present invention will be described with reference to the drawings. FIG. 1 is a schematic diagram showing an example of the resin structure according to the present invention. As shown in FIG. 1, a resin structure 10 according to the present invention includes a resin member 1 including a resin material. Here, the resin structure 10 shown in FIG. 1 is formed of a single resin material. In the resin structure 10 according to the present invention, the resin member 1 has the uneven thickness structure. Therefore, the resin member 1 includes a thick-walled portion 2 and two thin-walled portions 3. The overall shape of the resin member 1 is convex (hat-shaped) into the impact absorbing direction and includes the thin-walled portions 3 and the thick-walled portion 2, in which the thin-walled portion 3, the thick-walled portion 2, and the thin-walled portion 3 are disposed in that order in a direction Y perpendicular to an impact absorbing direction X of the resin structure 10. The average thicknesses of the two thin-walled portions 3 are the same. In addition, in the resin structure 10 according to the present invention, the shape of the resin member 1 satisfies t1/t2 defined by Expression (I) and L/d defined by Expression (II).

Figure 2A:
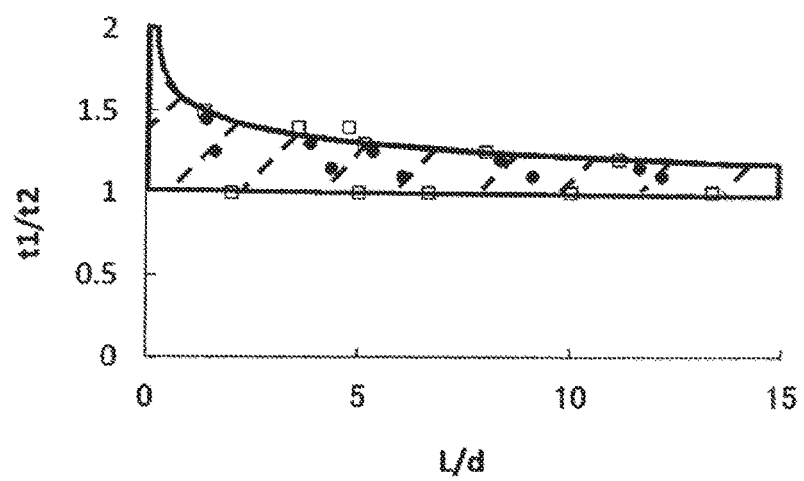
FIGS. 2A and 2B are graphs showing relationships between t1/t2 and L/d represented by Expressions (I) and (II).
Figure 2B:
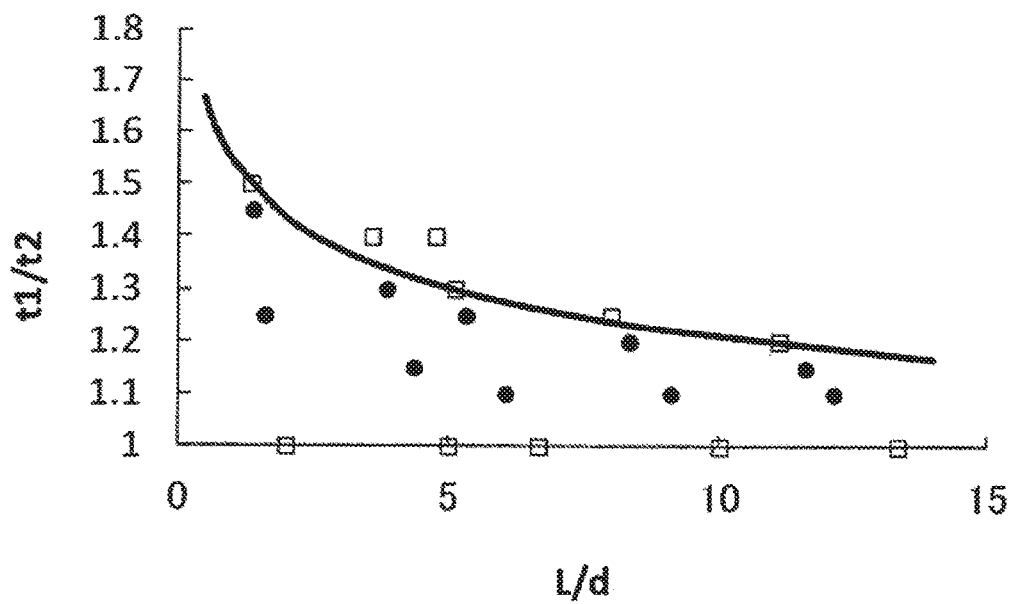

In FIG. 2A, a hatched range represents a range defined by Expressions (I) and (II) in the present invention. FIG. 2B is an enlarged view showing the hatched range in FIG. 2A.

Figure 3A:
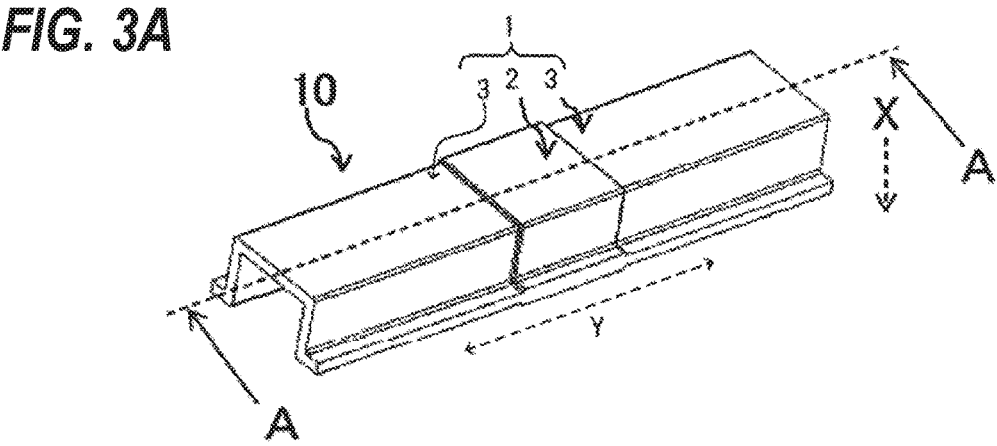
FIGS. 3A and 3B are diagrams for describing parameters used in Expressions (I) and (II).
Figure 3B:
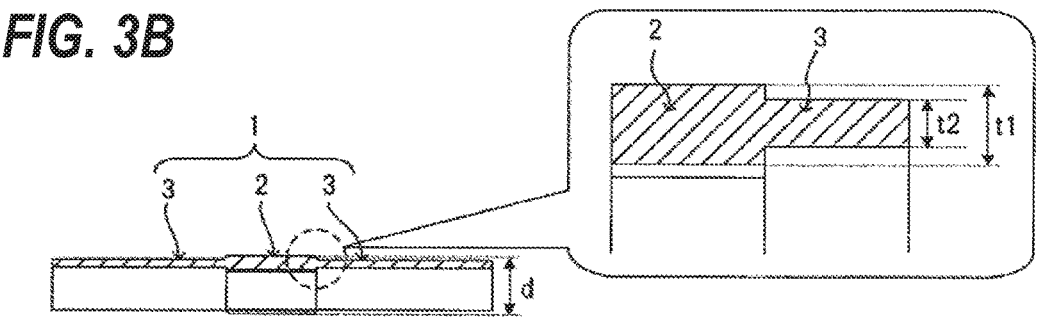
Figure 5A:
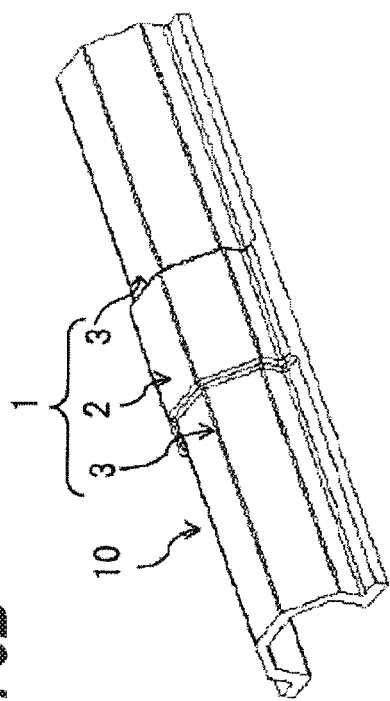
FIGS. 5A to 5D are schematic diagrams showing another example of the resin structure according to the present invention.
Figure 5B:
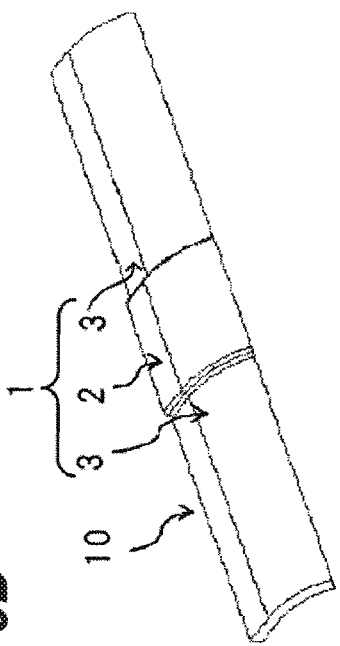
Figure 5C:
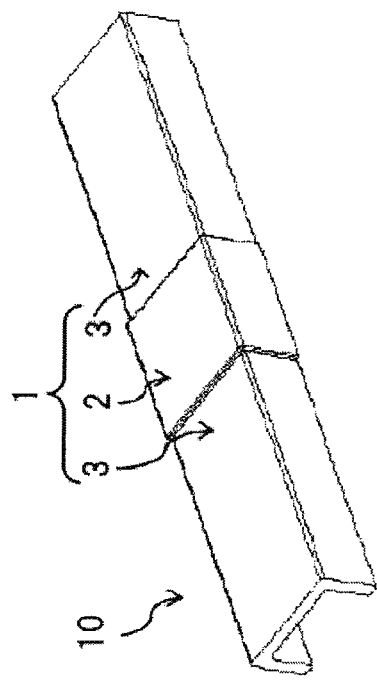
Figure 5D:
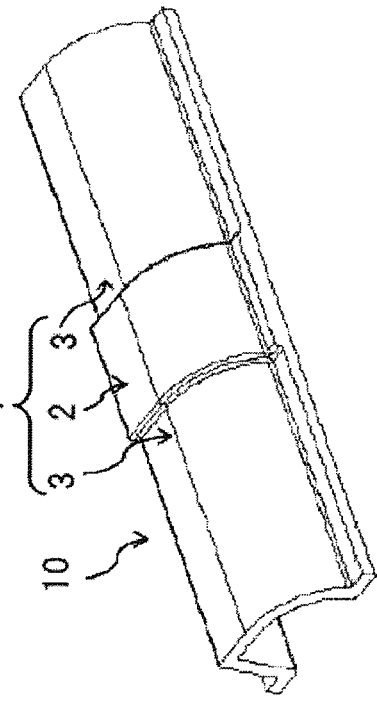
Figure 6A:
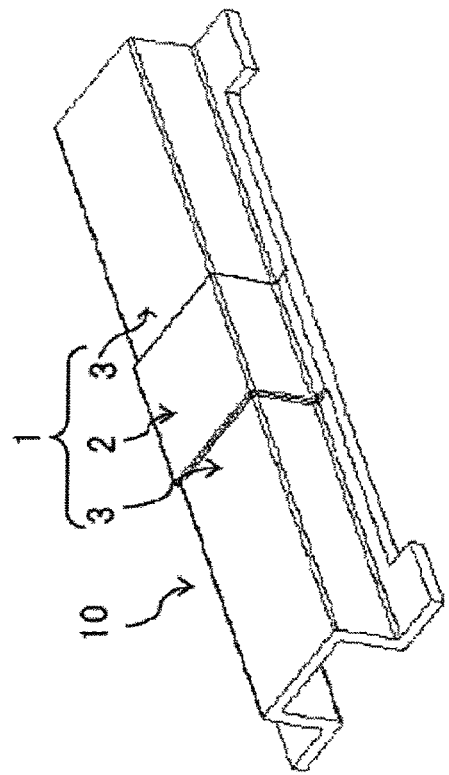
FIGS. 6A to 6C are schematic diagrams showing still another example of the resin structure according to the present invention.
Figure 6B:
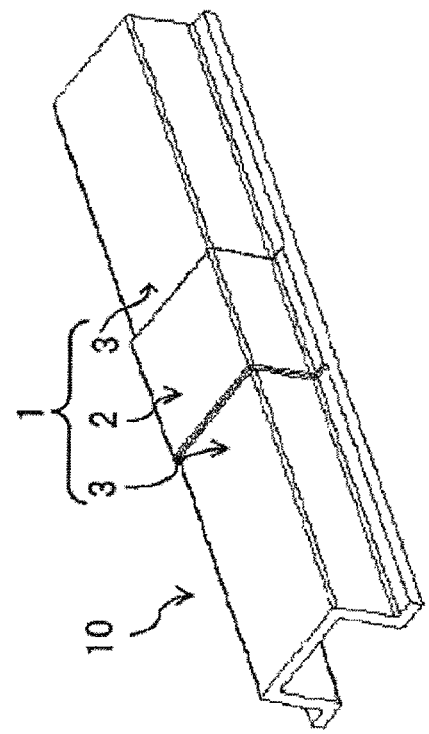
Figure 6C:
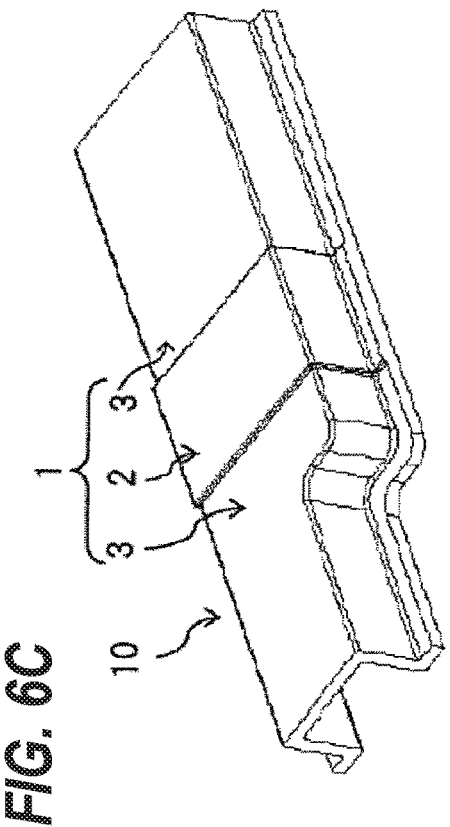

Next, parameters used in Expressions (I) and (II) in the present invention will be described with reference to the drawings. FIGS. 3A and 3B are diagrams relating to the parameters used in Expressions (I) and (II) in the present invention. Here, FIG. 3B is a cross-sectional view taken along line AA in FIG. 3A. As shown in FIG. 3B, in Expressions (I) and (II), t1 represents the average thickness (mm) of the thick-walled portion 2, and t2 represents the average thickness (mm) of the thin-walled portions 3. In addition, d represents a maximum height (mm) in the impact absorbing direction X in a range between the connection points of the resin member (the connection points can refer to FIGS. 4A and 4B).

In addition, as shown in FIGS. 4A and 4B, in a case where the resin structure 10 according to the present invention is connected to other structures, in Expressions (I) and (II), L represents the distance (mm) between connection points 4 where the resin structure 10 according to the present invention is connected to other structures, and d represents a maximum height (mm) in the impact absorbing direction in a range between the connection points 4 of the resin member 10. Here, FIG. 4A shows an example in which an uneven structure (energy director) is formed on each of the two thin-walled portions 3 as a connection portion for connecting the resin structure 10 according to the present invention to other structures. FIG. 4B shows an example in which a through hole is formed on each of the two thin-walled portions 3 as a connection portion. In FIG. 4A, the inter-connection-point distance L represents the distance of a straight line connecting the centers of the uneven structures in the direction Y. In FIG. 4B, the inter-connection-point distance L represents the distance of a straight line connecting the centers of the through holes in the direction Y.

FIGS. 1 and 3A and 3B show the example in which the resin structure according to the present invention is constituted by the resin member having an open cross-section and a hat shape when seen from the direction Y. The shape of the resin member and the resin structure used in the present invention is not limited to the above-described hat shape. For example, the shape when seen from the direction Y may be a Greek character π shape, a semicircular shape, or a polygonal shape. FIGS. 5A to 5D and FIGS. 6A to 6C are schematic diagrams showing other examples of the resin structure according to the present invention. As shown in the same drawings, the resin structure according to the present invention can adopt various shapes as long as it satisfies Expressions (I) and (II).

In the resin structure according to the present invention, in the resin member having the uneven thickness structure, t1/t2 defined by Expression (I) and L/d defined by Expression (II) are in the above-described ranges. As a result, for example, in a case where the resin structure according to the present invention is connected to other structures such that the thick-walled portion is the load point, fracturing at a boundary between the thick-walled portion and the thin-walled portion can be prevented. In addition, the strength of the resin member can be improved by setting the load point in the thick-walled portion having a relatively large thickness. As a result, the energy absorption capacity of the resin structure according to the present invention can be increased. Thus, according to the present invention, the resin structure having an excellent impact absorbing property can be obtained. In addition, the resin member used in the present invention has the uneven thickness structure which includes the thick-walled portion and the thin-walled portions. However, this resin member is formed of a resin material and thus can be manufactured only by press-molding without using a welding step or the like. Thus, the resin structure according to the present invention can be manufactured using a simple manufacturing method.

Hereinafter, the resin structure according to the present invention will be described.

1. Resin Member

First, the resin member used in the present invention will be described. The resin member used in the present invention includes the thick-walled portion and the two thin-walled portions, has the uneven thickness structure in which the thin-walled portion, the thick-walled portion, and the thin-walled portion are disposed in that order, and satisfies Expressions (I) and (II). In addition, the resin member used in the present invention is formed of a resin material.

(1) Regarding t1/t2 t1/t2 defined by Expression (I) will be described. t1/t2 represents a value obtained by dividing the "average thickness t1 of the thick-walled portion" by the "average thickness t2 of the thin-walled portions". In the definition expression of t1/t2, the denominator and the numerator have the same unit system. The t1/t2 represents a value having an influence on a variation in a deformed state of the resin member according to the present invention when an impact energy is applied thereto. That is, in the resin structure according to the present invention, t1/t2 is in the above-described range of Expression (I). As a result, in a case where the resin structure according to the present invention is used as an energy absorbing member such that the thick-walled portion of the resin member is the load point, when an impact is applied to the load point in the impact absorbing direction, the fracture origin can be made to be the thick-walled portion. In other words, the resin structure according to the present invention satisfies Expression (I). As a result, the fracturing of the resin structure starts from the fracture origin as initially designed. In addition, since the thick-walled portion is the load point, the impact absorbing property of the fracture origin can be improved. Therefore, the impact absorbing property of the resin structure according to the present invention as a whole can be improved. Here, the fracture origin refers to a position where the fracturing of the resin structure starts when a load is applied to the resin structure according to the present invention.

On the other hand, it is assumed that t1/t2 is equal to or more than the right-hand side of Expression (I). In this case, even in a case where the resin structure according to the present invention is used such that the load point is the thick-walled portion, when an impact is applied to the load point, the fracture origin is changed from the load point (thick-walled portion) to another position, for example, to a boundary between the thick-walled portion and the thin-walled portion. Therefore, the impact absorbing property of the resin structure as a whole deteriorates. In addition, it is assumed that t1/t2 is equal to or less than the left-hand side of Expression (I). In this case, the fracture origin is not changed from the load point, but the thickness of the thick-walled portion is less than the thickness of the thin-walled portion. Therefore, the impact absorbing property of the resin structure as a whole deteriorates.

t1/t2 is not particularly limited as long as it is in the range of Expression (I), and can be appropriately adjusted depending on the configuration of the resin structure according to the present invention, the shape of the resin member, or the like. In particular, in the present invention, it is more preferable that t1/t2 is in a range of $1 < t1/t2 < 1.51 \times (L/d)^{-0.107}$.

In addition, the values of t1 and t2 in the present invention are not particularly limited as long as they are in ranges where Expression (I) is satisfied, and can be appropriately adjusted depending on the intended use of the resin structure according to the present invention or the like. Typically, t1 is in a range of 1.05 mm to 27 mm, and t2 is in a range of 1 mm to 15 mm.

(2) Regarding L/d

Next, L/d defined by Expression (II) will be described. L/d represents a value obtained by dividing the "inter-connection-point distance in a case where a bending load is applied" by the "maximum height in the range between the connection points of the resin member". Here, in the definition expression of L/d, the denominator and the numerator have the same unit system.

The inter-connection-point distance L is the distance between the connection points when the resin structure according to the present invention is connected to other structures, and the details thereof are as described above. The maximum height d is the maximum height in the impact absorbing direction in a range between the connection points of the resin member. The maximum height includes the thickness of the thick-walled portion.

In particular, in the present invention, it is more preferable that the maximum height d is in a range of $3 < L/d < 14$. In a case where the maximum height d is in the above-described range, the effects of the present invention can be significantly exhibited.

In addition, the values of L and d in the present invention are not particularly limited as long as they are in ranges where Expression (I) is satisfied, and can be appropriately adjusted depending on the intended use of the resin structure according to the present invention or the like. Typically, L is in a range of 10 mm to 3000 mm, and d is in a range of 1 mm to 300 mm.

In a case where the resin member used in the present invention is a solid structure, the thickness t1 of the thick-walled portion is the height d.

(3) Resin Material

Next, the resin material used in the resin member will be described. The resin material used in the present invention is not particularly limited as long as it exhibits a desired impact absorbing property, and an arbitrary resin material can be appropriately selected depending on the intended use of the resin structure. Therefore, the resin material used in the present invention may be a thermoplastic resin or a thermosetting resin.

[Thermoplastic Resin]

The thermoplastic resin used in the present invention is not particularly limited as long as it can impart a desired impact absorbing property to the resin structure according to the present invention. Examples of the thermoplastic resin include a polyolefin resin, a polystyrene resin, a thermoplastic polyamide resin, a polyester resin, a polyacetal resin (polyoxymethylene resin), a polycarbonate resin, a (meth) acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluororesin, and a thermoplastic polybenzimidazole resin.

Examples of the polyolefin resin include a polyethylene resin, a polypropylene resin, a polybutadiene resin, a polymethyl pentene resin, a vinyl chloride resin, a vinylidene chloride resin, a vinyl acetate resin, and a polyvinyl alcohol resin.

Examples of the polystyrene resin include a polystyrene resin, an acrylonitrile-styrene resin (AS resin), and an acrylonitrile-butadiene-styrene resin (ABS resin). Examples of the polyamide resin include a polyamide 6 resin (nylon 6), a polyamide 11 resin (nylon 11), a polyamide 12 resin (nylon 12), a polyamide 46 resin (nylon 46), a polyamide 66 resin (nylon 66), and a polyamide 610 resin (nylon 610). Examples of the polyester resin include a polyethylene terephthalate resin, a polyethylene naphthalate resin, a polybutylene terephtalate resin, a polytrimethylene terephtalate resin, and liquid crystal polyester. Examples of the (meth) acrylic resin include polymethyl methacrylate. Examples of the modified polyphenylene ether resin include modified polyphenylene ether. Examples of the thermoplastic polyimide resin include thermoplastic polyimide, a polyamide imide resin, and a polyetherimide resin. Examples of the polysulfone resin include a modified polysulfone resin, and a polyether sulfone resin. Examples of the polyether ketone resin include a polyether ketone resin, a polyether ether ketone resin, and a polyether ketone ketone resin. Examples of the fluororesin include polytetrafluoroethylene.

As the thermoplastic resin used in the present invention, one kind may be used alone, or two or more kinds may be used in combination. Examples of the configuration where two or more kinds of thermoplastic resins are used in combination include a configuration where thermoplastic resins having different softening points or melting points are used in combination, and a configuration where thermoplastic resins having different average molecular weights are used in combination. However, the present invention is not limited to these examples.

[Thermosetting Resin]

Examples of the thermosetting resin used in the present invention include cured products of an epoxy resin, a vinyl ester resin, an unsaturated polyester resin, a diallylphthalate resin, a phenol resin, a maleimide resin, a cyanate resin, a benzoxazine resin, a dicyclopentadiene resin, and the like, and modified products thereof. The epoxy resin is not particularly limited as long as it has an epoxy group in the molecule, and examples thereof include a bisphenol A type epoxy resin, a bisphenol F type epoxy resin, a phenol novolac type epoxy resin, a cresol novolac type epoxy resin, a bisphenol AD type epoxy resin, a biphenyl type epoxy resin, a naphthalene type epoxy resin, an alicyclic epoxy resin, a glycidyl ester resin, a glycidyl amine epoxy resin, a heterocyclic epoxy resin, a diaryl sulfone epoxy resin, a hydroquinone epoxy resin, and modified products thereof. As the thermosetting resin used in the present invention, one kind may be used alone, or two or more kinds may be used in combination.

[Fiber-Reinforced Resin Material]

The resin material used in the present invention may be formed of only the thermoplastic resin or the thermosetting resin described above. However, as the resin material, a fiber-reinforced resin material including the thermoplastic resin or the thermosetting resin as a matrix resin and further including reinforcing fibers in the matrix resin is preferably used. The fiber-reinforced resin material has a higher strength per weight than a metal material and thus is suitably used as an alternative material to a metal material of the related art.

(Reinforcing Fibers)

The kind of the reinforcing fibers can be appropriately selected depending on the kind of the matrix resin and the like without any particular limitation. Therefore, as the reinforcing fibers used in the present invention, inorganic fibers or organic fibers can be preferably used.

Examples of the inorganic fibers include carbon fibers, activated carbon fibers, graphite fibers, glass fibers, tungsten carbide fibers, silicon carbide fibers, ceramic fibers, alumina fibers, natural fibers, mineral fibers such as basalt, boron fibers, boron nitride fibers, boron carbide fibers, and metal fibers. Examples of the metal fibers include an aluminum fibers, copper fibers, brass fibers, stainless steel fibers, and steel fibers. Examples of the glass fibers include fibers formed of E glass, C glass, S glass, D glass, T glass, quartz glass, borosilicate glass, and the like.

Examples of the organic fibers include fibers formed of a resin material such as polybenzazole, aramid, polyparaphenylene bezoxazole (PBO), polyphenylene sulfide, polyester, acryl, polyamide, polyolefin, polyvinyl alcohol, or polyarylate.

As the reinforcing fiber used in the present invention, one kind may be used alone, or two or more kinds may be used in combination. In the present invention, in a case where two or more kinds of reinforcing fibers are used, plural kinds of inorganic fibers may be used in combination, plural kinds of organic fibers may be used in combination, or inorganic fibers and organic fibers may be used in combination. Examples of the configuration in which plural kinds of inorganic fibers are used in combination include a configuration in which carbon fibers and metal fibers are used in combination, and a configuration in which carbon fibers and glass fibers are used in combination. On the other hand, examples of the configuration in which plural kinds of organic fibers are used in combination include a configuration in which aramid fibers and fibers formed of another organic material are used in combination. Further, examples of the configuration in which inorganic fibers and organic fibers are used in combination include a configuration in which carbon fibers and aramid fibers are used in combination.

In the present invention, carbon fibers are preferably used as the reinforcing fibers. By using the carbon fibers, a light-weight fiber-reinforced resin material having a high strength can be obtained. As the carbon fibers, for example, polyacrylonitrile (PAN)-based carbon fibers, petroleum-based pitch carbon fibers, coal-based pitch carbon fibers, rayon-based carbon fibers, cellulose-based carbon fibers, lignin-based carbon fibers, phenol-based carbon fibers, or vapor-grown carbon fibers are known. In the present invention, among the above-described carbon fibers, any kind of carbon fibers can be preferably used.

A sizing agent may be attached to surfaces of the reinforcing fibers used in the present invention. In a case where the reinforcing fibers to which the sizing agent is attached are used, the kind of the sizing agent can be appropriately selected depending on the kinds of the reinforcing fibers and a matrix resin without any particular limitation.

The average fiber length of the reinforcing fibers used in the present invention is not particularly limited and is preferably in a range of 1 to 100 mm, more preferably in a range of 5 to 75 mm, and still more preferably in a range of 10 to 50 mm. It is preferable that the average fiber length is 1 mm or more because the tensile strength of the fiber-reinforced resin material is in a desired range and the impact absorbing property is excellent. In addition, it is also preferable that the average fiber length is 100 mm or less because the fiber length is not excessively long, the fluidity of the fiber-reinforced resin material is improved, and a desired shape is likely to be obtained during molding. Here, the "average fiber length" may be a number average fiber length (Ln) or a weight average fiber length (Lw). Of course, in a case where all the fiber lengths of the reinforcing fibers are the same, the number average fiber length (Ln) and the weight average fiber length (Lw) are the same. When the fiber length of each reinforcing fiber is represented by Li, the number average fiber length (Ln) and the weight average fiber length (Lw) are obtained from the following Expressions (a) and (b).

$$Ln=\Sigma Li/j \qquad (a)$$

$$Lw=(\Sigma Li^2)/(\Sigma Li) \qquad (b)$$

The fiber length Li of each of the reinforcing fibers can be obtained by measuring the fiber lengths of 100 fibers, which are randomly extracted from the fiber-reinforced resin material, using a caliper or the like in units of 1 mm. The reinforcing fibers can be extracted from the fiber-reinforced resin material, for example by heating the fiber-reinforced material at 500° C. for 1 hour to remove the resin therefrom in a furnace.

In a case where two or more peak values are present in a fiber length distribution of the reinforcing fibers used in the present invention, at least one of the peak values is preferably in a range of 1 to 100 mm, more preferably in a range of 5 to 75 mm, and still more preferably in a range of 10 to 50 mm.

The average fiber diameter of the reinforcing fibers used in the present invention may be appropriately determined depending on the kind of the reinforcing fibers and the like without any particular limitation. For example, in a case where carbon fibers are used as the reinforcing fibers, typically, the average fiber diameter is preferably in a range of 3 μm to 50 μm, more preferably in a range of 4 μm to 12 μm, and still more preferably in a range of 5 μm to 8 μm. On the other hand, in a case where glass fibers are used as the reinforcing fibers, typically, the average fiber diameter is preferably in a range of 3 μm to 30 μm. Here, the average fiber diameter refers to the average diameter of single fibers of the reinforcing fibers. Therefore, in a case where the reinforcing fibers are in the form of a fiber bundle, the average fiber diameter refers not to the diameter of the fiber bundle but to the average diameter of reinforcing fibers (single fibers) constituting the fiber bundle. The average fiber diameter of the reinforcing fibers can be measured using a method described in JIS R7607:2000. The content of JIS R7607:2000 is incorporated herein by reference.

Irrespective of the kind thereof, the reinforcing fibers used in the present invention may be in the single fiber form including single fibers or in the fiber bundle form including a plurality of single fibers. In addition, in the reinforcing fibers used in the present invention, only single fibers may be present, only fiber bundles may be present, or both single fibers and fiber bundles may be present together. In a case where the reinforcing fibers are used s in the form of a fiber bundle, the number of single fibers constituting each fiber bundle may be the same as or different from that constituting another fiber bundle. In a case where the reinforcing fibers used in the present invention are in the form of a fiber bundle, the number of single fibers constituting each fiber bundle is not particularly limited and is typically in a range of 1000 to 100000.

In general, the carbon fiber is in the form of a fiber bundle in which several thousands to several ten thousands of filaments are gathered. In a case where carbon fibers are used as the reinforcing fibers, when the carbon fibers are used as they are, an entangled portion in the fiber bundle becomes locally thick, and it may be difficult to obtain a thin-walled fiber-reinforced material. Therefore, in a case where carbon fibers are used as the reinforcing fibers, typically, the fiber bundle is widened or opened and then used.

In a case where a carbon fiber bundle is opened and used, the opening degree of the opened carbon fiber bundle is not particularly limited. It is preferable that the opening degree of the fiber bundle is controlled and that the carbon fibers include: a carbon fiber bundle including carbon fibers of a specific number or more; and carbon fibers (single fibers) of less than the specific number or a carbon fiber bundle including carbon fibers of less than the specific number. In this case, specifically, it is preferable that the carbon fibers include: a carbon fiber bundle (A) constituted by carbon fibers of a critical number of single fiber or more, the critical number of single fibers being defined by the following Expression (1); and opened carbon fibers other than the carbon fiber bundle (A), the opened carbon fibers being in the form of single fibers or a fiber bundle including carbon fibers of less than the critical number of single fiber.

$$\text{Critical Number of Single Fiber} = 600/D \qquad \text{Expression (1)}$$

(Here, D represents an average fiber diameter (μm) of carbon fibers.)

Further, in the present invention, a proportion of the carbon fiber bundle (A) with respect to the total amount of the carbon fibers in the fiber-reinforced resin material is preferably higher than 0 vol % and lower than 99 vol %, more preferably 20 vol % or higher and lower than 99 vol %, still more preferably 30 vol % or higher and lower than 95 vol %, and most preferably 50 vol % or higher and lower than 90 vol %. By causing not only the carbon fiber bundle (A) including a specific number of carbon fibers or more but also the opened carbon fibers or carbon fiber bundle other than the carbon fiber bundle (A) to be present together as described above, the abundance of the carbon fibers in the fiber-reinforced resin material, that is, the fiber volume fraction (Vf) can be increased.

The opening degree of the carbon fibers can be made to be in a desired range, for example, by adjusting opening conditions of the fiber bundle. For example, in a case where air is blown to the fiber bundle to open the fiber bundle, the opening degree can be adjusted by controlling the pressure or the like of the air blown to the fiber bundle. In this case, by adjusting the air pressure to be strong, the opening degree increases (the number of single fibers constituting each fiber bundle decreases). By adjusting the air pressure to be weak, the opening degree decreases (the number of single fibers constituting each fiber bundle increases).

In the present invention, in a case where carbon fibers are used as the reinforcing fibers, the average number (N) of fibers in the carbon fiber bundle (A) can be appropriately determined without any particular limitation in a range where the object of the present invention can be achieved. In the case of carbon fibers, the average number (N) is typically in a range of 1<N<12000 and more preferably satisfies the following Expression (2).

$$0.6 \times 10^4/D^2 < N < 1 \times 10^5/D^2 \qquad (2)$$

(wherein D represents the average fiber diameter (μm) of the carbon fibers)

(Fiber-Reinforced Resin Material)

As described above, the fiber-reinforced resin material used in the present invention includes reinforcing fiber and a matrix resin. In the present invention, as the matrix resin, a thermoplastic resin is preferably used. By using a thermoplastic resin as the matrix resin, for example, in a case where a resin impact absorbing member according to the present invention is manufactured by press-molding, there is an advantageous effect in that, for example, the molding time can be reduced. In addition, by using a thermoplastic resin as the matrix resin, the fiber-reinforced resin material used in the present invention can be recycled or reused.

The tensile modulus of the fiber-reinforced resin material used in the present invention is not particularly limited as long as a desired impact absorbing property can be imparted to the resin member according to the present invention. In particular, the tensile modulus is preferably 10 GPa or higher, more preferably 15 GPa or higher, and still more preferably 20 GPa or higher. In a case where the tensile modulus is lower than the above-described range, the rigidity of the resin member is insufficient, and the impact absorbing property may decrease. The tensile modulus of the fiber-reinforced resin material used in the present invention can be made to be in the above-described range using, for example, a method of adjusting the volume fraction of the reinforcing fibers in the fiber-reinforced resin material, a method of adjusting the fiber length, or a method of changing the kind of the reinforcing fibers and/or the matrix resin. Most specifically, the tensile modulus can be increased by increasing the volume fraction of the reinforcing fiber, by increasing the fiber length, or by using reinforcing fibers having a high tensile modulus and/or a matrix resin having a high tensile modulus. In addition, the tensile modulus can be decreased by performing the above-described method vice versa. The upper limit value of the tensile modulus of the fiber-reinforced resin material used in the present invention is not particularly limited. Typically, the upper limit is preferably 100 GPa or lower.

In addition, the tensile strength of the fiber-reinforced resin material used in the present invention is not particularly limited and is preferably 100 MPa or higher, more preferably 150 MPa or higher, and still more preferably 250 MPa or higher. In a case where the tensile strength of the fiber-reinforced resin material is lower than the above-described range, the strength of the resin member is insufficient, and the impact absorbing property may decrease. The tensile strength of the fiber-reinforced resin material used in the present invention can be made to be in the above-described range using, for example, a method of adjusting the volume fraction of the reinforcing fibers in the fiber-reinforced resin material, a method of adjusting the fiber length, or a method of changing the kind of the reinforcing fibers and/or the matrix resin. Most specifically, the tensile strength can be increased by increasing the volume fraction of the reinforcing fiber, by increasing the fiber length, or by using reinforcing fibers having a high tensile strength and/or a matrix resin having a high tensile strength. The upper limit value of the tensile strength of the fiber-reinforced resin material used in the present invention is not particularly limited. Typically, the upper limit is preferably 2000 MPa or lower.

The tensile modulus and the tensile strength of the fiber-reinforced resin material can be measured using, for example, a method described in JIS K7164:2005. The content of JIS K7164:2005 is incorporated herein by reference.

As described above, the fiber-reinforced resin material used in the present invention includes at least reinforcing fiber and a matrix resin. Optionally, the fiber-reinforced resin material may further include various additives within a range where the object of the present invention can be achieved. The various additives are not particularly limited as long as a desired function or properties can be imparted to the fiber-reinforced resin material depending on the intended use of the resin member according to the present invention and the like. Examples of the various additives used in the present invention include a melt viscosity-reducing agent, an antistatic agent, a pigment, a softener, a plasticizer, a surfactant, conductive particles, a filler, a carbon black, a coupling agent, a foaming agent, a lubricant, a corrosion inhibitor, a nucleating agent, a crystallization promoter, a release agent, a stabilizer, an ultraviolet absorber, a colorant, a discoloration preventing agent, an antioxidant, a flame retardant, a flame retardant promoter, a dripping inhibitor, a lubricant, a fluorescent brightening agent, a luminous pigment, a fluorescent dye, a fluidity modifier, an inorganic or organic antibacterial agent, an insecticide, a photocatalytic antifouling agent, an infrared absorber, and a photochromic agent.

In addition, as the various additives, the fiber-reinforced resin material used in the present invention may include short fibers having a short fiber length. As the short fibers used herein, the above-described reinforcing fibers can be used, except that the average fiber length (weight average fiber length, number average fiber length) thereof is shorter than that of the above-described reinforcing fibers. The short fibers have a shorter fiber length than the above-described reinforcing fibers. For example, the average fiber length (weight average fiber length, number average fiber length) of the short fibers is 1 mm or less.

The above-described various additives can also be adopted even in a case where not the fiber-reinforced resin material but a thermoplastic resin or a thermosetting resin not including the above-described reinforcing fibers is used as the resin material.

The abundance of the matrix resin in the fiber-reinforced resin material used in the present invention can be appropriately determined depending on the kind of the matrix resin, the kind of the reinforcing fibers, and the like without any particular limitation. Typically, the abundance is in a range of 3 parts by mass to 1000 parts by mass with respect to 100 parts by mass of the reinforcing fibers.

The volume fraction of the reinforcing fibers in the fiber-reinforced resin material used in the present invention is preferably 10 vol % to 70 vol %. From the viewpoint of an excellent impact absorbing property, it is preferable that the volume fraction of the reinforcing fibers in the fiber-reinforced resin material is 10 vol % or higher because a desired tensile modulus or a desired tensile strength is likely to be obtained. On the other hand, it is preferable that the volume fraction of the reinforcing fibers in the fiber-reinforced resin material is 70 vol % or lower because the fluidity of the fiber-reinforced resin material is improved and a desired shape is likely to be obtained during molding. The volume fraction of the reinforcing fibers in the fiber-reinforced resin material is more preferably in a range of 20 vol % to 60 vol % and still more preferably in a range of 30 vol % to 50 vol %.

In addition, the state where the reinforcing fibers are present in the fiber-reinforced resin material is not particularly limited. For example, in the fiber-reinforced resin material, the reinforcing fibers may be unidirectionally aligned, or may be randomly oriented. In particular, in the present invention, from the viewpoint of uniformity of the shape rigidity or the strength in the resin impact absorbing member, it is preferable that the reinforcing fibers are two-dimensionally randomly oriented such that the long axis direction of the reinforcing fibers is an in-plane direction of the fiber-reinforced resin material. The two-dimensional random orientation of the carbon fibers in the fiber-reinforced resin material can be verified, for example, by measuring the tensile modulus in a tensile test in which an arbitrary direction of the fiber-reinforced material and a direction perpendicular to the arbitrary direction are set as the reference, and then measuring a ratio (Eδ) which is obtained by dividing a higher value by a lower value among the measured tensile modulus values. As the tensile modulus ratio is lower than 2, it can be evaluated that the carbon fibers are two-dimensionally randomly oriented. From the viewpoint of achieving excellent two-dimensional random orientation, the tensile modulus ratio is preferably lower than 1.8, more preferably lower than 1.5, and still more preferably lower than 1.3.

(Method of Manufacturing Fiber-Reinforced Resin Material)

Next, a method of manufacturing the fiber-reinforced resin material used in the present invention will be described. In general, the fiber-reinforced resin material used in the present invention can be manufactured using a well-known method. For example, the fiber-reinforced resin material can be manufactured through the following steps: 1. a step of cutting the reinforcing fibers; 2. a step of opening the cut reinforcing fibers; and 3. a step of obtaining a prepreg by mixing the opened reinforcing fibers with the matrix resin in the form of a fiber or particles and then heating and compressing the mixture. However, the present invention is not limited to this method. In this method, the prepreg is the fiber-reinforced resin material.

(4) Resin Member

The resin member used in the present invention has the uneven thickness structure and includes the thick-walled portion and the two thin-walled portions. However, the resin member may include only one thick-walled portion or may include two or more thick-walled portions. In a case where the resin member according to the present invention includes two or more thick-walled portions, the thicknesses of the two or more thick-walled portions may be the same as or different from each other.

Figure 7:
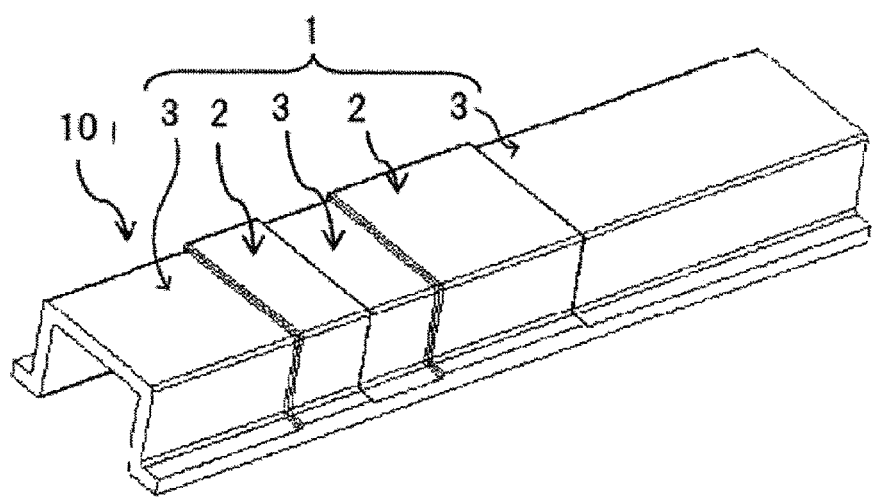
FIG. 7 is a schematic diagram showing still another example of the resin structure according to the present invention.

FIG. 7 is a schematic diagram showing an example in a case where the resin member according to the present invention includes a plurality of thick-walled portions. The resin member 1 of the resin structure 10 shown in FIG. 7 includes two thick-walled portions 2 and three thin-walled portions 3, in which the thin-walled portion 3, the thick-walled portion 2, the thin-walled portion 3, the thick-walled portion 2, and the thin-walled portion 3 are disposed in that order in the direction Y. In this configuration, the connection points are formed on the left thin-walled portion 3 and the right thin-walled portion 3, respectively. As shown in the same drawing, the resin member 1 used in the present invention may include a plurality of thick-walled portions 2.

In a case where the resin member used in the present invention includes a plurality of thick-walled portions, t1 in Expression (I) represents a maximum thickness (mm) of the thick-walled portion in a range between the connection points of the resin member. In addition, in a case where the resin member used in the present invention includes a plurality of thick-walled portions, at least one of the thick-walled portions only has to satisfy Expressions (I) and (II).

In the resin member according to the present invention, the thick-walled portion and the thin-walled portion may be formed as separate members and then integrated with each other, or may be integrally formed as a single member. In the resin member according to the present invention, in a case where the thick-walled portion and the thin-walled portion are integrally formed as a single member, there is an advantageous effect in that the productivity is excellent.

The configuration in which the resin member according to the present invention includes a plurality of thick-walled portions is not particularly limited, and a configuration which is suitable for the intended use of the resin structure according to the present invention can be appropriately selected. Accordingly, for example, a configuration in which a plurality of thick-walled portions having the same shape are used may be adopted, or a configuration in which a plurality of thick-walled portions having different shapes are used in combination may be adopted. In addition, in the configuration in which a plurality of thick-walled portions having different shapes are used in combination, at least one of the thick-walled portions only has to satisfy Expressions (I) and (II). Accordingly, a configuration in which all the thick-walled portions satisfy Expressions (I) and (II) may be adopted, or a configuration in which a thick-walled portion which satisfies Expressions (I) and (II) and a thick-walled portion which does not satisfy Expressions (I) and (II) are used in combination may be adopted. Further, a configuration in which a plurality of thick-walled portions having different resin materials are used in combination may be adopted.

(5) Method of Manufacturing Resin Member

Next, a method of manufacturing the resin member will be described. In general, the resin member according to the present invention can be manufactured using a well-known method. For example, in a case where the fiber-reinforced resin material including the thermoplastic resin as the matrix resin is used as the resin material, a method of heating the fiber-reinforced resin material to a temperature of a softening point or higher in advance, and cold-pressing the heated fiber-reinforced resin material in a mold having a temperature lower than the softening point of the thermoplastic resin can be adopted. In addition, a hot pressing method of putting and pressing the fiber-reinforced resin material in a mold having a temperature a softening point of the thermoplastic resin or higher, and cooling the pressed fiber-reinforced resin material to a temperature lower than the softening point of the thermoplastic resin can also be adopted. However, the present invention is not limited to these methods. In order to adjust t1/t2 to be in the range defined in the present invention, for example, the shape of the mold may be determined such that t1/t2 is in the range defined in the present invention.

2. Resin Structure (1) Configuration of Resin Structure

Next, the resin structure according to the present invention will be described. In the resin structure according to the present invention, the above-described resin member is used. In the resin structure according to the present invention, a configuration in which the resin member is used may be appropriately determined depending on the intended use of the resin structure and the like. Accordingly, a configuration in which the resin structure according to the present invention includes one resin member or two or more resin members may be adopted, or a configuration in which the resin structure according to the present invention includes a combination of the resin member and another member may be adopted.

As the configuration in which the resin structure according to the present invention includes only the resin member, a configuration in which the resin structure includes a single resin member may be adopted, or a configuration in which the resin structure includes a combination of a plurality of resin members may be adopted. The resin structure including a single resin member has an advantageous effect in that the resin structure can be easily designed such that the thick-walled portion of the resin member is the load point. On the other hand, in the resin structure including a combination of a plurality of resin members, the resin members having various shapes can be arbitrarily combined. Therefore, there is an advantageous effect in that a shape which is suitable for the intended use can be easily achieved.

Figure 8:
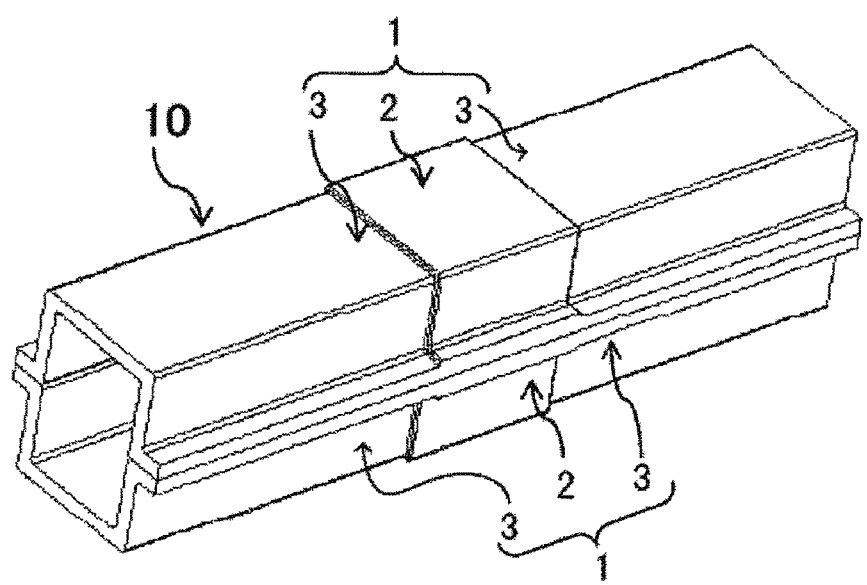
FIG. 8 is a schematic diagram showing still another example of the resin structure according to the present invention.

FIG. 8 is a schematic diagram showing an example of a case where the resin structure according to the present invention includes a plurality of resin members. As shown in the same drawing, the resin structure 10 according to the present invention may have a hollow structure in which two resin members 1 (shown in FIG. 6A) having an open cross-section and a hat shape are used and combined such that the open cross-sections of the resin members 1 face each other.

In the resin structure according to the present invention, in a case where the resin member according to the present invention is combined with another member, a member having an arbitrary shape or formed of an arbitrary material can be appropriately selected and used as the other member depending on the shape, the intended use, or the like of the resin structure. For example, the other member may be formed of a resin material or a metal material such as iron or aluminum. In a case where the other member is formed of a resin material, the other member may be formed by press-molding as an integrated product with the resin member according to the present invention. Alternatively, the other member as a separate member may be joined to the resin member using a method such as welding, bonding, or riveting. On the other hand, in a case where the other member is formed of a metal material, typically, the other member is joined to the resin member according to the present invention using a method such as insert molding, bonding, or screwing.

In addition, in the resin structure according to the present invention, in a case where the resin member is combined with another member, one resin member may be used, or a plurality of resin members may be used.

The resin structure according to the present invention includes the connection points. In general, the connection points are formed using a well-known method depending on the above-described form of the connection portion.

(2) Use of Resin Structure

The use of the resin structure according to the present invention is not particularly limited. By being connected to other structures, the resin member can be preferably used as an impact absorbing member in which the thick-walled portion of the resin member is the load point. That is, the resin structure according to the present invention is connected to other structures at the connection points, and the thick-walled portion of the resin member is the load point. As a result, an excellent impact absorbing property can be exhibited, and the fracture origin can be limited to the thick-walled portion. Accordingly, by using the resin structure according to the present invention for the above-described use, an excellent impact absorbing property can be achieved over the entire area of the resin structure. In addition, the fracture origin can be easily designed for the above-described use. In a case where the resin structure according to the present invention is used as an impact absorbing member, the resin structure absorbs an impact energy which is input from one direction of the resin structure so as to suppress an impact to the opposite side. The resin structure according to the present invention can be preferably used as the above-described vehicle component as well as, for example, an electric or electronic device, a medical device, or a general industrial component.

Second. Vehicle Component

Next, the vehicle component according to the present invention will be described. In the vehicle component according to the present invention, the resin structure according to the present invention is used.

In the vehicle component according to the present invention, the above-described resin structure invention is used. Therefore, in the vehicle component, it is preferable that the thick-walled portion of the resin member can be used as the load point. As a result, the impact absorbing property of the vehicle component according to the present invention can be improved, and the fracture origin during impact absorption can be easily designed. Examples of the vehicle component include a center pillar, a side sill, and a bumper beam. However, the present invention is not limited to these examples.

The present invention is not limited to the above-described embodiment. The above-described embodiment is merely exemplary, and any embodiments having substantially the same configurations and the same effects as in the technical ideas described in the claims are included in the technical scope of the present invention.

EXAMPLES

Hereinafter, the present invention will be described in more detail using Examples. Of course, the present invention is not limited to configurations of the following Examples.

Values in Examples were obtained using the following methods.

(1) Average Fiber Length of Reinforcing Fibers

Regarding the average fiber length of the reinforcing fibers in the fiber-reinforced resin material, the fiber-reinforced resin material was heated in a furnace at 500° C. for 1 hour to remove the thermoplastic resin therefrom, the lengths of 100 arbitrarily extracted reinforcing fibers were measured in units of 1 mm using a caliper, and the average value (average molecular weight) thereof was obtained. In a case where the average fiber length was lower than 1 mm, the lengths of the fibers were measured in units of 0.1 mm using an optical microscope. In a case where the average fiber length of the reinforcing fibers in the thermosetting fiber-reinforced resin material was measured, the fiber-reinforced resin material was heated in a furnace at 500° C. for 3 hours to remove the thermosetting resin therefrom, and then the average fiber length was measured using the same method as described above. In the Examples, the fiber length of the reinforcing fibers was uniform. Therefore, the number average fiber length and the weight average fiber length were the same.

(2) Volume Fraction of Reinforcing Fibers in Fiber-Reinforced Resin Material

Regarding the volume fraction of the reinforcing fibers in the fiber-reinforced resin material, the density of the fiber-reinforced resin material was obtained using an underwater substitution method, and the volume fraction of the reinforcing fibers was calculated based on a relationship between the specific density of the reinforcing fibers, which was measured in advance, and the specific density of the resin.

(3) Tensile Modulus and Tensile Strength of Fiber-Reinforced Resin Material

Regarding the tensile modulus and the tensile strength of the fiber-reinforced resin material, the tensile modulus and the tensile strength of a specimen, which was dried in advance in a vacuum at 80° C. for 24 hours, was measured according to JIS K7164:2000.

(4) Impact Absorbing Property of Resin Structure

Figure 9:
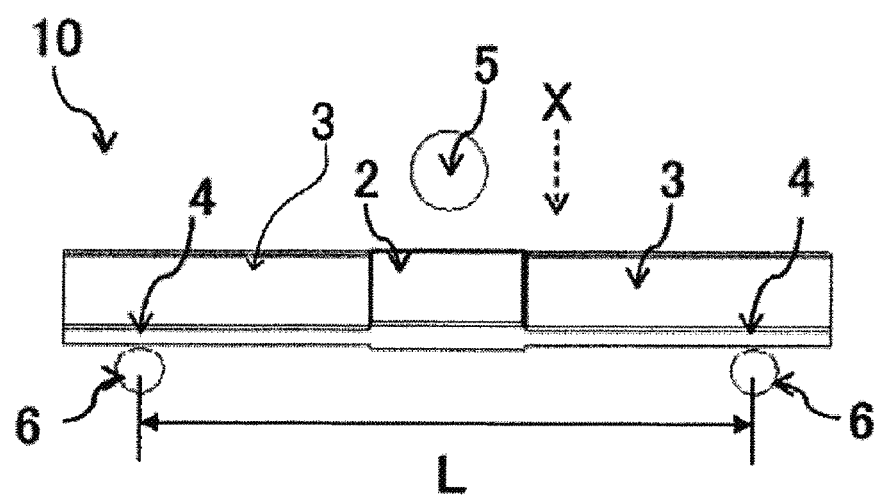
FIG. 9 is a diagram for describing a three-point bending test.

The impact absorbing property of the resin structure was evaluated based on a value obtained by dividing an energy absorbed in a three-point bending test by the weight of the resin member. It can be said that, as the impact absorbing property increases, the performance of the resin member increases. FIG. 9 shows the configuration of the three-point bending test. The resin structure 1 was disposed such that the thick-walled portion 2 of the resin structure 1 was positioned below a three-point bending indenter 5 and the connection points 4 were positioned above stators 6. The three-point bending indenter 5 was moved in the impact absorbing direction at 5 mm/min, and the resin structure was deformed until it was fractured.

Reference Example 1

As the reinforcing fibers, PAN carbon fibers "TENAX (registered trade name) STS40-24KS (manufactured by Toho Tenax Co., Ltd.; average fiber diameter: 7 μm) were cut into an average fiber length of 20 mm and were used. As the thermoplastic resin, nylon 6 resin A1030 (manufactured by Unitika Ltd.) was used. Using a press machine heated to 280° C., the reinforcing fibers and the thermoplastic resin were heated and compressed under a pressure 2.0 MPa for 5 minutes. As a result, a fiber-reinforced resin material A in which the carbon fibers were two-dimensionally randomly oriented in the in-plane direction was prepared. In the obtained fiber-reinforced resin material A, the tensile modulus was 20 GPa, the tensile strength was 150 MPa, and the density was 1300 kg/m$^3$. The average fiber length of the reinforcing fibers was about 20 mm

[Shape of Resin Member]

Examples and Comparative Examples, which were verified using the resin member having a hat shape shown in FIG. 1 according to one embodiment of the present invention, will be described. In each of the Examples and the Comparative Examples described below, the values (t1, t2, d) representing the dimensions of the resin member are as shown in FIGS. 3A and 3B and 4A and 4B.

Example 1

The fiber-reinforced resin material A according to Reference Example 1 was heated to 280° C. and was cold-pressed under a pressure of 10 MPa for 60 seconds to form a resin member, and a resin structure was prepared using only this resin member. Regarding the dimensions of the respective portions, t1=2.30 mm, t2=2.00 mm, and d=6.15 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 1.00 J/g.

Example 2

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.40 mm, t2=2.00 mm, and d=8.20 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 1.61 J/g.

Example 3

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.20 mm, t2=2.00 mm, and d=12.10 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 1.43 J/g.

Example 4

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.50 mm, t2=2.00 mm, and d=12.25 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 1.84 J/g.

Example 5

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.60 mm, t2=2.00 mm, and d=16.30 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 2.11 J/g.

Example 6

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.90 mm, t2=2.00 mm, and d=40.45 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 4.83 J/g.

Example 7

The fiber-reinforced resin material A according to Reference Example 1 was heated to 280° C. and was cold-pressed under a pressure of 10 MPa for 60 seconds to form a resin member, and a resin structure was prepared using only this resin member. Regarding the dimensions of the respective portions, t1=2.20 mm, t2=2.00 mm, and d=6.10 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 0.95 J/g.

Example 8

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.20 mm, t2=2.00 mm, and d=8.10 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 1.27 J/g.

Example 9

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.30 mm, t2=2.00 mm, and d=16.15 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 1.77 J/g.

Example 10

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.50 mm, t2=2.00 mm, and d=40.25 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the thick-walled portion, and the impact absorbing property thereof was 2.74 J/g.

Comparative Example 1

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.00 mm, t2=2.00 mm, and d=6.00 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the load point, and the impact absorbing property thereof was 0.92 J/g.

Comparative Example 2

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.40 mm, t2=2.00 mm, and d=6.20 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 0.87 J/g.

Comparative Example 3

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.00 mm, t2=2.00 mm, and d=8.00 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the load point, and the impact absorbing property thereof was 1.03 J/g.

Comparative Example 4

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.50 mm, t2=2.00 mm, and d=8.25 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 1.02 J/g.

Comparative Example 5

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.00 mm, t2=2.00 mm, and d=12.00 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the load point, and the impact absorbing property thereof was 1.27 J/g.

Comparative Example 6

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.60 mm, t2=2.00 mm, and d=12.30 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 1.08 J/g.

Comparative Example 7

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.80 mm, t2=2.00 mm, and d=12.40 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 1.00 J/g.

Comparative Example 8

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.00 mm, t2=2.00 mm, and d=16.00 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at the load point, and the impact absorbing property thereof was 1.47 J/g.

Comparative Example 9

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.80 mm, t2=2.00 mm, and d=16.40 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 1.35 J/g.

Comparative Example 10

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=2.00 mm, t2=2.00 mm, and d=40.00 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 0.64 J/g.

Comparative Example 11

The fiber-reinforced resin material A according to Reference Example 1 was heated to 280° C. and was cold-pressed under the same conditions as in Example 1 to form a resin member, and a resin structure was prepared using only this resin member. Regarding the dimensions of the respective portions, t1=3.00 mm, t2=2.00 mm, and d=40.50 mm. In addition, through holes having a diameter of 5 mm were formed as the connection portions such that L=80 mm, and the distance between the centers of the through holes was obtained as the inter-connection-point distance.

When this resin structure was bent at three points under conditions of L=80 mm, indenter diameter: 10 mm, and stator diameter: 6 mm, the resin structure was fractured at a boundary between the thick-walled portion and the thin-walled portion, and the impact absorbing property thereof was 1.68 J/g.

Table 1 shows the impact absorbing property of the resin structure of each of the Examples and the Comparative Examples. In the table, d−(t1−t2)/2 represents the height (mm) of the thin-walled portion between the connection points of the resin member having a hat shape used in each of the Examples and the Comparative Examples.

TABLE 1

|  |  | t1/t2 | | | | | | | | |
|---|---|---|---|---|---|---|---|---|---|---|
|  |  | 1.00 | 1.10 | 1.15 | 1.20 | 1.25 | 1.30 | 1.40 | 1.45 | 1.50 |
| d − (t1 − t2)/2 | 6 | 0.92 (Comparative Example 1) | 0.95 (Example 7) | 1.00 (Example 1) | 0.87 (Comparative Example 2) | | | | | |
|  | 8 | 1.03 (Comparative Example 3) | 1.27 (Example 8) | | 1.61 (Example 2) | 1.02 (Comparative Example 4) | | | | |
|  | 12 | 1.27 (Comparative Example 5) | 1.43 (Example 3) | | | 1.84 (Example 4) | 1.08 (Comparative Example 6) | 1.00 (Comparative Example 7) | | |
|  | 16 | 1.47 (Comparative Example 8) | | 1.77 (Example 9) | | | 2.11 (Example 5) | 1.35 (Comparative Example 9) | | |
|  | 40 | 0.64 (Comparative Example 10) | | | | 2.74 (Example 10) | | | 4.83 (Example 6) | 1.68 (Comparative Example 11) |

In Table 1, the experimental results were colored white when fracturing occurred at the load point and the impact absorbing properties were practical values under the condition that the values of d−(t1−t2)/2 were the same. It can be seen from the results of Table 1 that the impact absorbing properties of the resin structures according to Examples 1 to 10 were excellent.

In FIGS. 2A and 2B, points corresponding to (t1/t2) and L/d in the respective Examples were plotted by the symbol "●", and points corresponding to (t1/t2) and L/d in the respective Comparative Examples were plotted by the symbol "□".

In FIG. 2B, an approximation curve expression obtained from the plot of the Comparative Examples in which the value of (t1/t2) was higher than 1 was (t1/t2)=1.545×(L/d)$^{-0.107}$. Accordingly, in a range in which the value of (t1/t2) was more than 1 and less than 1.545×(L/d)$^{-0.107}$, a resin structure having an excellent bending impact absorbing property can be realized.

INDUSTRIAL APPLICABILITY

The structure according to the present invention absorbs an impact energy, which is input to one end, such that it can be used for suppressing an impact to the other end side. For example, the structure according to the present invention can be used as an impact absorbing device of a vehicle body or the like.

Hereinabove, the present invention has been described in detail with reference to the specific embodiment. However, the present invention is not limited to this embodiment, and various modifications can be made within a range not departing from the technical ideas of the present invention.

The present application is based on Japanese Patent Application No. 2015-60973 filed on Mar. 24, 2015, the content of which is incorporated herein by reference.

REFERENCE SIGNS LIST

1: RESIN MEMBER
2: THICK-WALLED PORTION
3: THIN-WALLED PORTION
4: CONNECTION POINT
5: THREE-POINT BENDING INDENTER
6: THREE-POINT BENDING STATOR
10: RESIN STRUCTURE
X: IMPACT ABSORBING DIRECTION

The invention claimed is:
1. A resin structure having an impact absorbing property, comprising:
a resin member including a resin material and having an uneven thickness structure,
wherein the resin member includes a thick-walled portion having an average thickness of a first value in an impact absorbing direction and two thin-walled portions having an average thickness of less than the first value in the impact absorbing direction,
the overall shape of the resin member is convex into the impact absorbing direction,
the thick-walled portion is disposed between the two thin-walled portions,
wherein one thin-walled portion, the thick-walled portion, and the other thin-walled portion are disposed in that order, and
the following Expressions (I) and (II) are satisfied,

$$1 < t1/t2 < 1.545 \times (L/d)^{-0.107} \quad \text{(I)}$$

$$L/d > 0 \quad \text{(II)}$$

wherein t1 represents an average thickness (mm) of the thick-walled portion, t2 represents an average thickness (mm) of the thin-walled portions, L represents an inter-connection-point distance (mm) between connection points which are formed on the two thin-walled portions, respectively, and are connected to other structures, and d represents a maximum height (mm) in the impact absorbing direction in a range between the connection points of the resin member.

2. The resin structure according to claim 1,
wherein the resin structure is formed of a single resin member.

3. The resin structure according to claim 1,
wherein the resin material is a fiber-reinforced resin material including reinforcing fibers and a matrix resin.

4. The resin structure according to claim 3,
wherein the fiber-reinforced resin material has a tensile modulus of 10 GPa or higher and a tensile strength of 100 MPa or higher.

5. A vehicle component comprising:
a resin structure according to claim 1.

* * * * *